United States Patent
Himmelmann (10) Patent No.: US 10,099,776 B2
(45) Date of Patent: Oct. 16, 2018

(54) RHEOLOGIC FLUID COUPLER FOR REDUNDANT LINEAR ELECTROMECHANICAL ACTUATORS

(71) Applicant: Hamilton Sundstrand Corporation, Windsor Locks, CT (US)

(72) Inventor: Richard A. Himmelmann, Beloit, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 700 days.

(21) Appl. No.: 14/671,640

(22) Filed: Mar. 27, 2015

(65) Prior Publication Data
US 2016/0280357 A1    Sep. 29, 2016

(51) Int. Cl.
| | | |
|---|---|---|
| *B64C 13/40* | (2006.01) | |
| *F16H 25/20* | (2006.01) | |
| *B64C 13/50* | (2006.01) | |
| B64C 27/605 | (2006.01) | |
| H01F 1/44 | (2006.01) | |

(52) U.S. Cl.
CPC .............. *B64C 13/40* (2013.01); *B64C 13/50* (2013.01); *F16H 25/20* (2013.01); *B64C 27/605* (2013.01); *F16H 2025/2071* (2013.01); *H01F 1/447* (2013.01)

(58) Field of Classification Search
CPC ...................................................... B64C 13/40
See application file for complete search history.

(56) References Cited

U.S. PATENT DOCUMENTS

| | | | | |
|---|---|---|---|---|
| 3,554,662 | A | * | 1/1971 | Lemont ................. B64C 27/605 416/1 |
| 4,664,236 | A | * | 5/1987 | Stangroom ............. F16D 27/00 192/21.5 |
| 5,014,829 | A | * | 5/1991 | Hare, Sr. .................... F01L 1/08 123/90.11 |
| 5,161,653 | A | * | 11/1992 | Hare, Sr. ................. F16F 9/532 137/514.3 |
| 5,598,908 | A | | 2/1997 | York et al. |
| 5,967,273 | A | | 10/1999 | Hampton |
| 6,102,177 | A | | 8/2000 | Moser et al. |

(Continued)

FOREIGN PATENT DOCUMENTS

| | | |
|---|---|---|
| DE | 102005049177 A1 | 4/2007 |
| EP | 2840020 A2 | 2/2015 |
| JP | 2009063011 A | 3/2009 |

OTHER PUBLICATIONS

Extended European Search Reported for EP Application No. 16161881.4, dated Oct. 28, 2016, 8 pages.

*Primary Examiner* — Colby M Hansen
(74) *Attorney, Agent, or Firm* — Kinney & Lange, P.A.

(57) ABSTRACT

An actuation assembly includes a first shaft comprising a first end disposed opposite a second end. The actuation assembly further includes a second shaft with a first end disposed opposite a second end. The first end of the second shaft is disposed within the second end of the first shaft such that the first end of the second shaft can move relative the second end of the first shaft. A fluid chamber formed between the first shaft and the second shaft at the second end of the first shaft. Magnetorheologic fluid is disposed inside the fluid chamber and a magnetic field generating coil is disposed around the second end of the first shaft and the first end of the second shaft.

13 Claims, 4 Drawing Sheets

(56) References Cited

U.S. PATENT DOCUMENTS

| | | |
|---|---|---|
| 6,345,868 B1 | 2/2002 | Bowman et al. |
| 2003/0155201 A1* | 8/2003 | Bowen .................. F16D 27/115 |
| | | 192/35 |
| 2013/0098187 A1 | 4/2013 | Raniero et al. |
| 2013/0175132 A1* | 7/2013 | Battlogg ................. F16D 37/02 |
| | | 192/21.5 |
| 2015/0083868 A1 | 3/2015 | Covington, Jr. et al. |

* cited by examiner

RHEOLOGIC FLUID COUPLER FOR REDUNDANT LINEAR ELECTROMECHANICAL ACTUATORS

BACKGROUND

This application relates generally to actuators, and more specifically to actuators for positioning flight control surfaces in aircraft.

In order to achieve the ultra-high reliability necessary for a flight control system in an aircraft, such as a helicopter, a triplex actuator (three separate actuators connected to each output for redundancy) is required. This type of system is necessary in case any one or two of the actuators fails, the aircraft will remain under control. If simple ball screw actuators (or rotary geared actuators) are used in the triplex actuator, a jam by one actuator would prohibit the other actuators from moving. This failure mode has historically been accommodated by providing mechanical disconnects or clutches to segregate a faulty actuator. These additional mechanical components not only increase the size, cost, and complexity of the system, the additional mechanical components also provide another possible source of failure.

SUMMARY

In one aspect of the invention, an actuation assembly includes a first shaft comprising a first end disposed opposite a second end. The actuation assembly further includes a second shaft with a first end disposed opposite a second end. The first end of the second shaft is disposed within the second end of the first shaft such that the first end of the second shaft can move relative the second end of the first shaft. A fluid chamber formed between the first shaft and the second shaft at the second end of the first shaft. Magnetorheologic fluid is disposed inside the fluid chamber and a magnetic field generating coil is disposed around the second end of the first shaft and the first end of the second shaft.

In another aspect of the invention, an actuation assembly includes a first shaft comprising a first end disposed opposite a second end. The actuation assembly also includes a second shaft comprising a first end disposed opposite a second end. The first end of the second shaft is disposed within the second end of the first shaft such that the first end of the second shaft can move relative the second end of the first shaft. A fluid chamber is formed between the first shaft and the second shaft at the second end of the first shaft. Magnetorheologic fluid disposed inside the fluid chamber and an element extends from an outer surface of the second shaft and into the fluid chamber. A magnetic field generating coil is disposed around the second end of the first shaft and the first end of the second shaft.

Persons of ordinary skill in the art will recognize that other aspects and embodiments of the present invention are possible in view of the entirety of the present disclosure, including the accompanying figures.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The present disclosure provides an actuation assembly that utilizes magnetorheologic fluid to couple and de-couple a linear or rotational output of an actuator from an output link. The actuation assembly can also include multiple actuators connected to a common output link. Each of the multiple actuators can include an output shaft segmented into a first shaft and a second shaft, and a fluid chamber containing magnetorheologic fluid disposed between the first shaft and the second shaft. Each of the multiple actuators can also include a magnetic field generating coil disposed around the first shaft, the second shaft, and the fluid chamber. When the magnetic field generating coil is activated, the magnetorheologic fluid inside the fluid chamber of the respective actuator functions as a solid and effectively connects first shaft and second shaft such that the actuator can actuate the common output link. As described below with reference to the Figures, should any of the multiple actuators seize-up, the magnetic field generating coil of the seized-up actuator can be deactivated, causing the magnetorheologic fluid in the fluid chamber of the seized-up actuator to behave as a fluid. When the magnetorheologic fluid in the fluid chamber behaves as a fluid, the first shaft and the second shaft of the seized-up actuator can move relative to each other, effectively decoupling the seized-up actuator from the common output link. With the seized-up actuator effectively decoupled from the common output link, the remaining actuators can continue moving and controlling the common output link without interference from the seized-up actuator.

Figure 1:
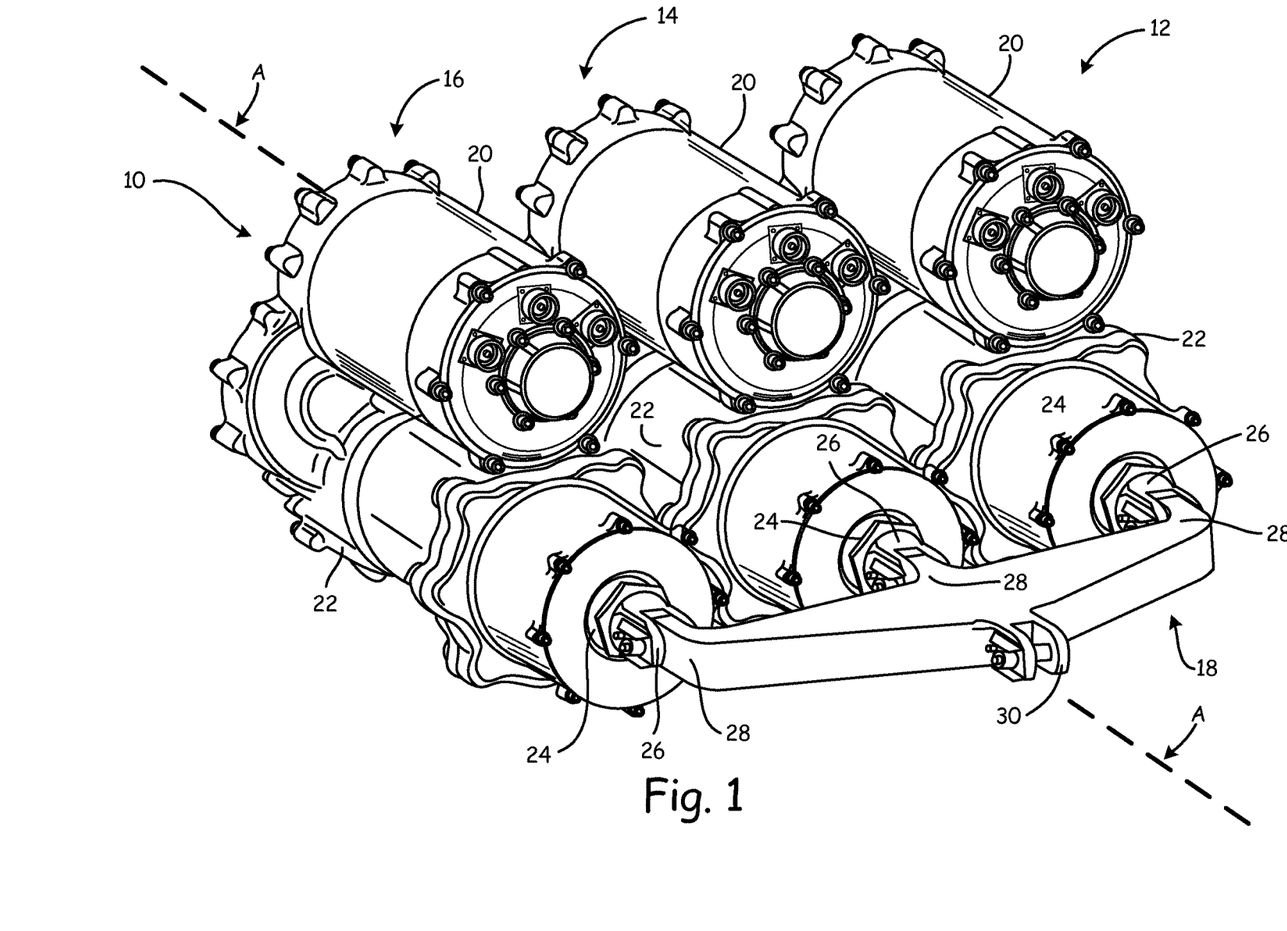
FIG. 1 is a perspective view of a linear actuation assembly with a magnetorheologic coupler.

FIG. 1 is a perspective view of actuation assembly 10. As shown in FIG. 1, actuation assembly 10 can include first linear actuator 12, second linear actuator 14, third linear actuator 16, and common output link 18. First linear actuator 12, second linear actuator 14, and third linear actuator 16 can be substantially identical to each other. Each of first linear actuator 12, second linear actuator 14, and third linear actuator 16 can include motor 20, ball screw assembly 22 with output ram 24, and actuator clevis 26. Common output link 18 can include at least three tangs 28 and output clevis 30. While common output link 18 shown in FIG. 1 includes three tangs 28, common output link 18 could include any number of tangs 28.

In each of first linear actuator 12, second linear actuator 14, and third linear actuator 16, motor 20 can be an electrically-powered, permanent magnet motor. Motor 20 can be mechanically coupled to ball screw assembly 22 such that an output of motor 20 actuates ball screw assembly 22. As motor 20 actuates ball screw assembly 22, ball screw assembly 22 can linearly translate output ram 24 and actuator clevis 26 along a center axis CA of ball screw assembly 22 and output ram 24. Each actuator clevis 26 of first linear actuator 12, second linear actuator 14, and third linear actuator 16 can be connected to one of tangs 28 respectively of common output link 18 such that first linear actuator 12, second linear actuator 14, and third linear actuator 16 are all connected to common output link 18. Output clevis 30 of common output link 18 can be connected to a flight control surface of an aircraft, or any other component that requires actuation.

During operation of actuation assembly 10, each of first linear actuator 12, second linear actuator 14, and third linear actuator 16 can be powered-on and effectively coupled to common output link 18 such that all three actuators 12, 14, 16 are actively moving and controlling in unison a position of common output link 18. Should any of actuators 12, 14, 16 experience a component failure, such as ball screw assembly 22 binding or seizing in one of actuators 12, 14, 16, the failed actuator can be effectively decoupled from common output link 18. Once effectively decoupled from common output link 18, output ram 24 of the problem actuator can move passively with common output link 18 relative the problem actuator. The remaining operational actuators of actuators 12, 14, 16 can continue moving common output link 18 with little to no resistance from the problem actuator. How first linear actuator 12, second linear actuator 14, and third linear actuator 16 can be effectively coupled and decoupled from common output link 18 is discussed in greater detail below with reference to FIGS. 2-3.

Figure 2:
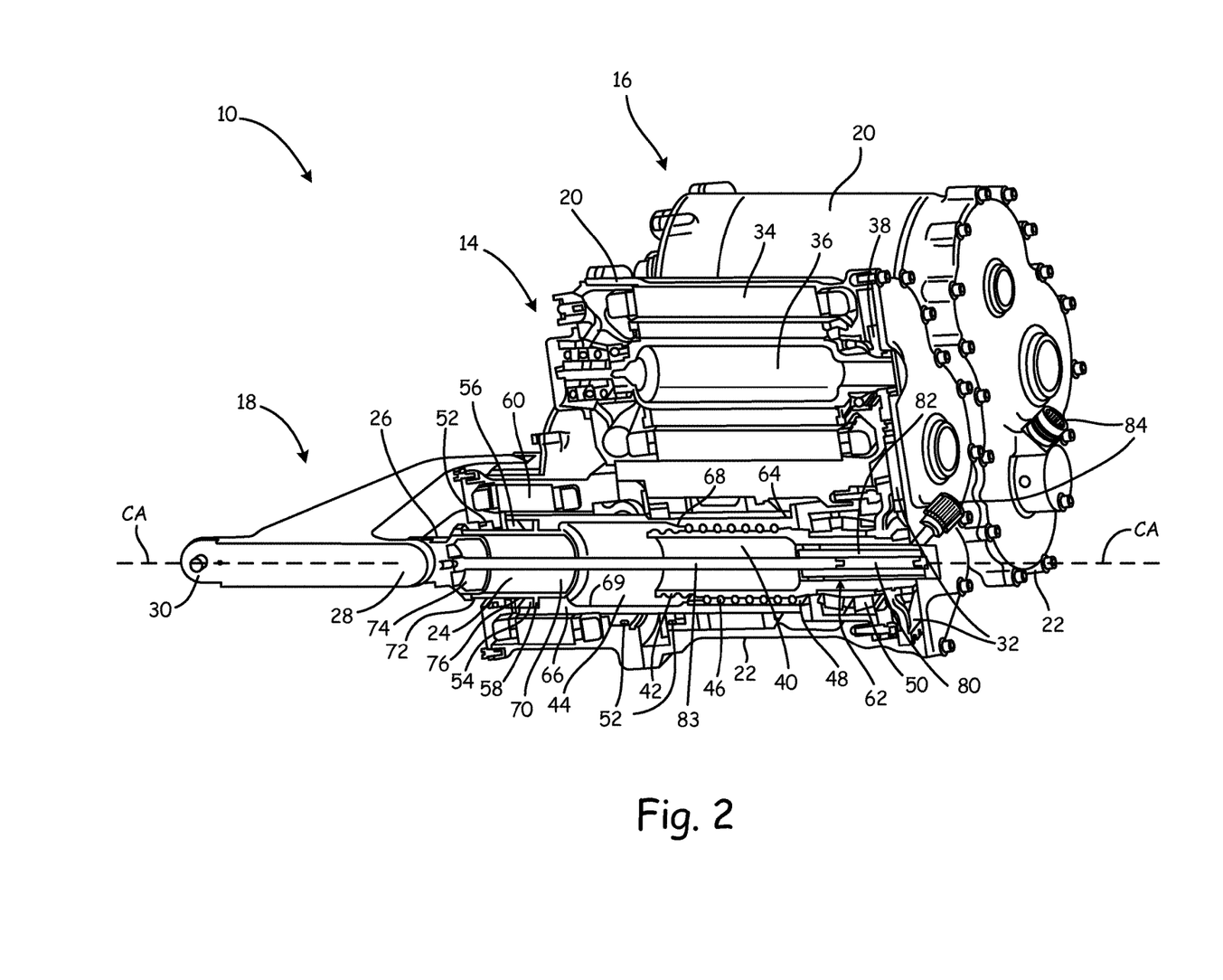
FIG. 2 is a cross-sectional view of the linear actuation assembly of FIG. 1 taken along line A-A.
Figure 3:
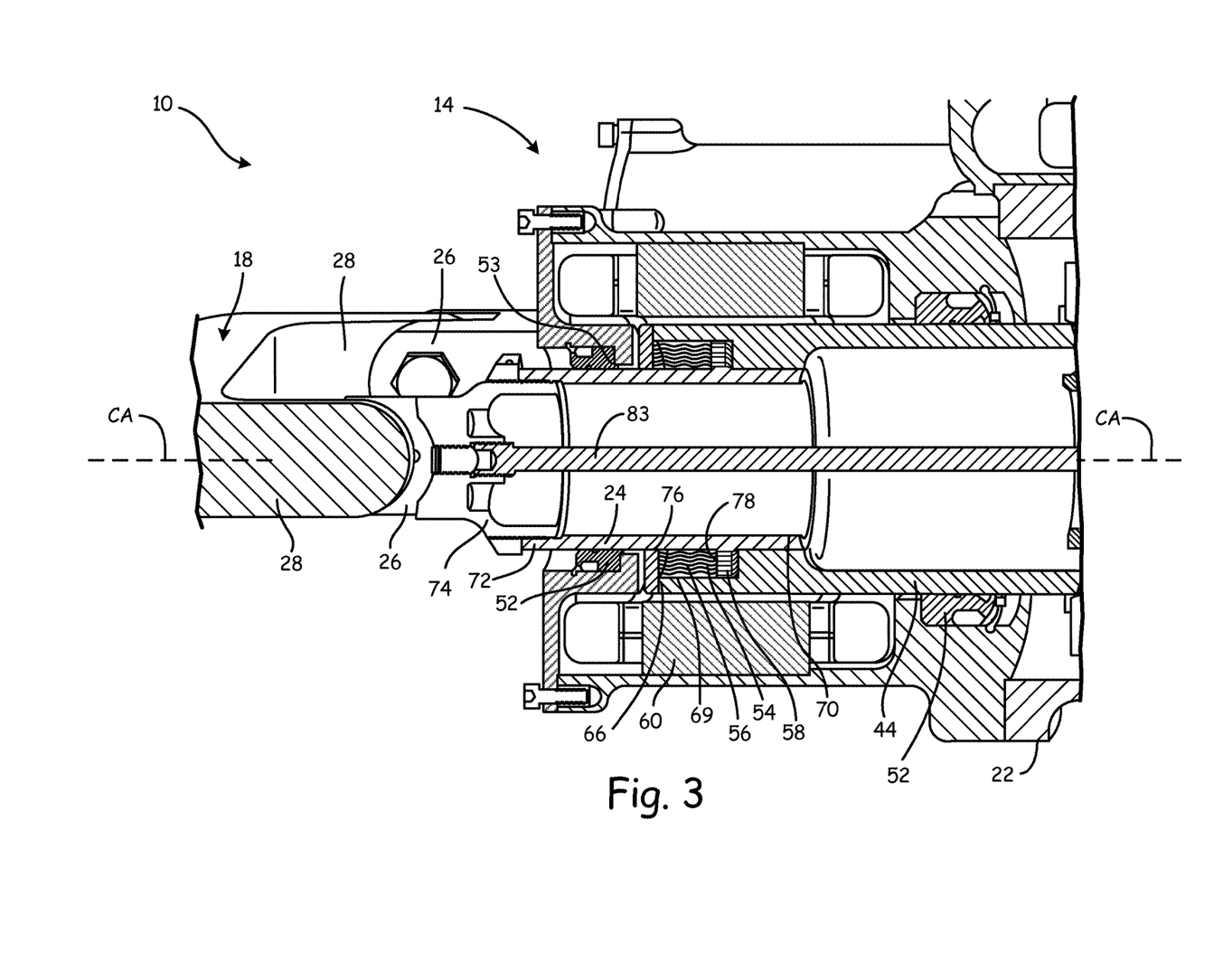
FIG. 3 is another cross-sectional view of the linear actuation assembly of FIG. 1 taken along line A-A.

FIGS. 2-3 will be discussed concurrently. FIGS. 2 and 3 are a cross-sectional views of actuation assembly 10 of FIG. 1 taken along line A-A. Both FIGS. 2 and 3 show an interior of second linear actuator 14. While the discussion of FIGS. 2 and 3 will be focused on the interior of second linear actuator 14, the description of the interior of second linear actuator 14 can be directly applied to first linear actuator 12 and third linear actuator 16 since all three actuators 12, 14, 16 can be substantially identical to each other. As shown in FIGS. 2 and 3, second actuator can further include gear reduction system 32. Motor 20 can include stator 34, rotor 36, and pinion gear 38. In addition to output ram 24, ball screw assembly 22 can include threaded shaft 40 with inner helical groove 42, ball screw ram 44, balls 46, ball return 48, thrust bearings 50, journal bearings 52, fluid chamber 54, magnetorheologic fluid 56, element 58, magnetic field generating coil 60, and position sensor 62. Ball screw ram 44 can be a first shaft that includes first end 64, second end 66, outer helical groove 68, and inner surface 69. Output ram 24 can be a second shaft that includes first end 70, second end 72, threaded cap 74, and outer surface 76. Element 58 can be a plate that includes orifices 78. Position sensor 62 can include sensor core 80, sensor tube 82, connecting link 83, and sensor output connection 84. Common output link 18, output ram 24, actuator clevis 26. Threaded shaft 40, ball screw ram 44, balls 46, ball return 48, and element 58 can all be made of metal, such as steel, aluminum, or titanium, or any other material with the necessary strength and durability needed to withstand the loads experienced by actuation assembly 10 during expected operational use.

Motor 20 can be a permanent magnet motor with stator 34 disposed around rotor 36. When energized, stator 34 will cause rotor 36 to rotate. Rotor 36 of motor 20 can be connected to pinion gear 38 such that rotor 36 rotates pinion gear 38. Pinion gear 38, gear reduction system 32, threaded shaft 40, and balls 46 mechanically connect motor 20 with first end 64 of ball screw ram 44 such that motor 20 can actuate ball screw ram 44 in a linear direction parallel with center axis CA. Gear reduction system 32 is meshed with pinion gear 38 and connected to threaded shaft 40.

At least a portion of threaded shaft 40 can be disposed within first end 64 of ball screw ram 44. Threaded shaft 40 can be supported by thrust bearings 50. Inner helical groove 42 can be formed on an outer surface of threaded shaft 40 such that inner helical groove 42 threads around the outer surface of threaded shaft 40. Outer helical groove 68 can be formed on inner surface 69 of ball screw ram 44 proximate first end 64 of ball screw ram 44 and opposite inner helical groove 42. Balls 46 are disposed between outer helical groove 68 and inner helical groove 42 and can use outer helical groove 68 and inner helical groove 42 as tracks to travel between ball screw ram 44 and threaded shaft 42. Ball return 48 is disposed between balls 46 and ball screw ram 44 and is configured to keep balls 46 from exiting outer helical groove 68 and inner helical groove 42. As motor 20 rotates threaded shaft 40 via pinion gear 38 and gear reduction system 32, first end 64 of ball screw ram 44 functions as a ball screw nut, allowing ball screw ram 44 to move forward and aft along center axis CA. Second end of ball screw ram 44 is disposed opposite first end 64 of ball screw ram 44.

As shown more closely in FIG. 3, first end 70 of output ram 24 is disposed opposite second end 72 of output ram 24. Second end 72 of output ram 24 is connected to threaded cap 74, and threaded cap 74 can comprise actuator clevis 26 that connects output ram 24 to common output link 18.

First end 70 of output ram 24 can be disposed within second end 66 of ball screw ram 44 such that first end 70 of output ram 24 telescopes within second end 66 of ball screw ram 44. The tolerances between first end 70 of output ram 24 and second end 66 of ball screw ram 44 are low enough that first end 70 of output ram 24 can move relative second end 66 of ball screw ram 44. Both output ram 24 and ball screw ram 44 can be supported by journal bearings 52. Seal 53 can also be disposed between the one of journal bearings 52 disposed around output ram 24 and fluid chamber 54 so as to keep magnetorheologic fluid 56 contained within fluid chamber 54.

Inner surface 69 of ball screw ram 44 at second end 72 of ball screw ram 44 can be spaced from outer surface 76 of output ram 24 so as to form fluid chamber 54 between ball screw ram 44 and output ram 24 at second end 66 of ball screw ram 44. Magnetorheologic fluid 56 is disposed inside fluid chamber 54 and substantially fills fluid chamber 54. Magnetic field generating coil 60 can be disposed around second end 66 of ball screw ram 44 and first end 70 of output ram 24. Magnetic field generating coil 60 is connected to an electrical power source so that magnetic field generating coil 60 can be selectively energized and de-energized. When magnetic field generating coil 60 is energized, magnetic field generating coil 60 induces a magnetic field into fluid chamber 54 and magnetorheologic fluid 56. The magnetic field produced by magnetic field generating coil 60 causes magnetorheologic fluid 56 to become so viscous that magnetorheologic fluid 56 essentially solidifies within fluid chamber 54. When magnetic field generating coil 60 is de-energized, magnetorheologic fluid 56 decreases in viscosity and behaves as a liquid.

Element 58 can extend from outer surface 76 of ball screw ram 44 and into fluid chamber 54 such that element 58 interacts with magnetorheologic fluid 56. As shown more closely in FIG. 3, element 58 can be an annular plate 58 that extends from outer surface 76 of ball screw ram 44 and into fluid chamber 54. When magnetic field generating coil 60 is energized and magnetorheologic fluid 56 solidifies, element 58 is captured by magnetorheologic fluid 56, thereby connecting output ram 24 to ball screw ram 44 such that output ram 24 cannot move independent of ball screw ram 44.

Thus, while magnetic field generating coil 60 is energized, output ram 24 and common output link 18 move in unison with ball screw ram 44 as ball screw ram 44 is actuated by motor 20.

Should ball screw assembly 22 of second actuator 14 seize-up in any way, such as a ball 46 binding up between threaded shaft 40 and ball screw ram 44, magnetic field generating coil 60 can be de-energized. After magnetic field generating coil 60 has been de-energized, element 58 of output ram 24 is able to move freely through magnetorheologic fluid 56, thereby effectively decoupling output ram 24 of second actuator 14 and common output link 18 from ball screw ram 44 of second actuator 14. Because common output link 18 is effectively decoupled from ball screw ram 44 of second actuator 14 in the event that second actuator 14 seizes or fails, first actuator 12 and/or third actuator 16 can continue to move and control common output link 18 with little to no resistance from second actuator 14. While the above-described process has been described with reference to second actuator 14, the above description can be equally applied to any of actuators 12, 14, 16.

As shown in FIGS. 2 and 3, orifices 78 can be formed in element 58 (plate 58) and can extend through element 58 such that magnetorheologic fluid 56 can more readily flow across element 58 when magnetic field generating coil 60 is not energized. By allowing magnetorheologic fluid 56 to flow across plate 58 when magnetic field generating coil 60 is not energized, orifices 78 can help reduce any resistance that magnetorheologic fluid 56 may cause between ball screw ram 44 and output ram 24 as output ram 24 moves relative ball screw ram 44. While element 58 has been described as a plate, element 58 can be any feature or component formed on outer surface 76 of output ram 24 that can be captured by magnetorheologic fluid 56 as magnetorheologic fluid 56 solidifies under the magnetic field created by energized magnetic field generating coil 60.

Position sensor 62 can be positioned along center axis CA and can be used to detect a position of output ram 24 relative ball screw ram 44. Position sensor 62 can be a linear variable differential transformer with sensor core 80, sensor tube 82 configured to receive sensor core 80. Sensor tube 82 can be disposed within threaded shaft 40 and sensor core 80 can be connected to output ram 24 via connecting link 83 and threaded cap 74. Sensor core 80 can extend along center axis CA such that at least a portion of sensor core 80 can extend within sensor tube 82. Sensor tube 82 includes multiple inductive coils. As output ram 24 changes position relative ball screw ram 44, output ram 24 moves sensor core 80 further into sensor tube 82, or further out of sensor tube 82. As sensor core 80 moves within sensor tube 82, sensor core 80 changes the inductance of the coils of sensor tube 82. The change of inductance of the coils of sensor tube 82 can be outputted as a signal through sensor connection 84 and used to determine a position of output ram 24 relative ball screw ram 44.

Figure 4:
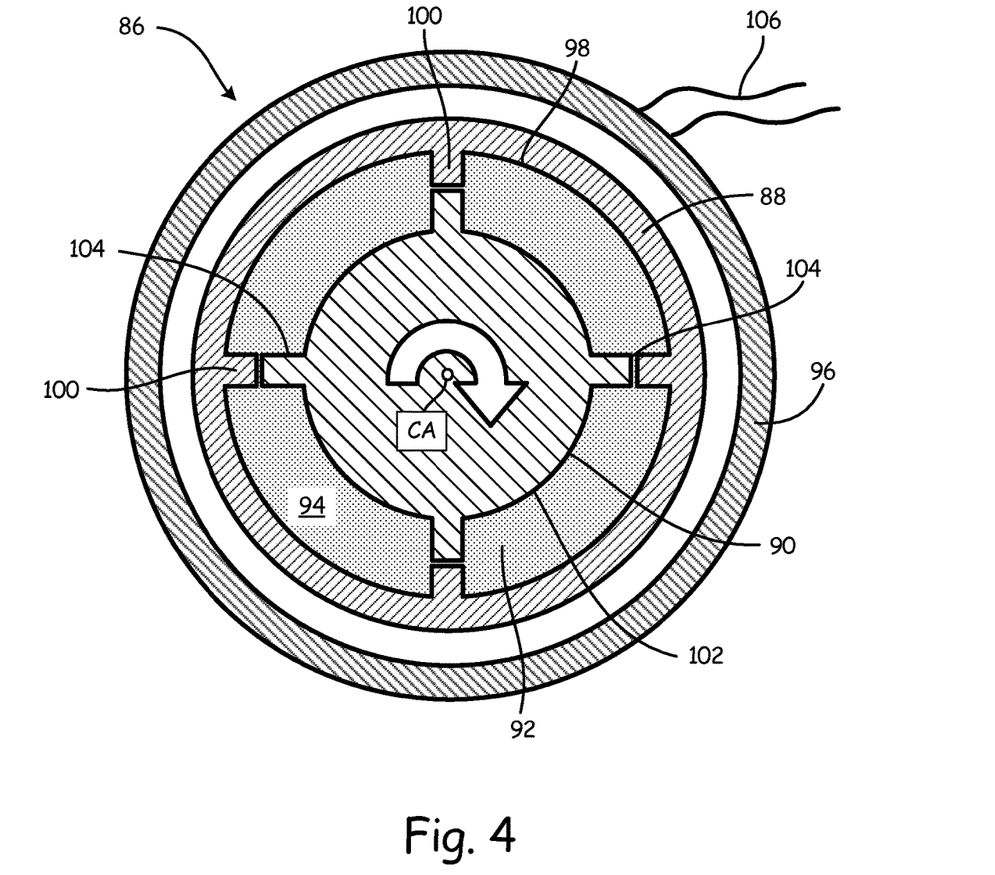
FIG. 4 is a cross-sectional view of a rotary actuation assembly with a magnetorheologic coupler.

At the beginning of operation of actuation assembly 10, each ball screw ram 44 of actuators 12, 14, 16 can be moved to a starting position such that every output ram 24 is in the same position relative the respective ball screw ram 44. Position sensors 62 can be used to confirm that all output rams 24 are in the same starting position. Once all of output rams 24 of actuators 12, 14, 16 are in the proper starting position, each magnetic field generating coil 60 of actuators 12, 14, 16 can be activated to solidify magnetorheologic fluid 56 in fluid chambers 54 and to couple all of output rams 24 to the respective ball screw rams 44. Actuators 12, 14, 16 are now ready to move common output link 18 in unison. As discussed above, should any of actuators 12, 14, 16 seize-up, the magnetic field generating coil 60 of the seized-up actuator can be de-energized to effectively de-couple the seized-up actuator from the common output link 18. As shown in FIG. 4, the scope of the present disclosure is not limited to linear actuators, but can also be applied to rotary actuators.

FIG. 4 is a cross-sectional view of rotational actuation assembly 86. As shown in FIG. 4, rotational actuation assembly 86 can include outer rotor shaft 88, inner rotor shaft 90, fluid chamber 92, magnetorheologic fluid 94, and magnetic field generating coil 96. Outer rotor shaft 88 can include inner surface 98 and radially inward extending flanges 100. Inner rotor shaft 90 can include outer surface 102 and radially outward extending flanges 104. Lead wires 106 can connect magnetic field generating coil 96 to an electrical power source, such as a battery or electrical generator.

A portion of inner rotor shaft 90, such as an end of inner rotor shaft 90, is disposed telescopically within an end of outer rotor shaft 88 such that both inner rotor shaft 90 and outer rotor shaft 88 share center axis CA. Outer surface 102 of inner rotor shaft 90 is sufficiently spaced radially from inner surface 98 of outer rotor shaft 88 so as to form fluid chamber 92 between inner rotor shaft 90 and outer rotor shaft 88. Magnetorheologic fluid 94 is disposed within fluid chamber 92 and magnetic field generating coil 96 is disposed radially outward from and around outer rotor shaft 88, inner rotor shaft 90, and fluid chamber 92.

Flanges 100 are connected to inner surface 98 of outer rotor shaft 88 and extend radially inward into fluid chamber 92 such that flanges 100 are in contact with magnetorheologic fluid 94. Flanges 104 are connected to outer surface 102 of inner rotor shaft 90 and extend radially outward from outer surface 102 into fluid chamber 92 such that flanges 104 are also in contact with magnetorheologic fluid 94. Flanges 100 and flanges 104 are sized so that flanges 100 and flanges 104 do not contact each other inside fluid chamber 92, thus allowing outer rotor shaft 88 and inner shaft rotor shaft 90 to rotate independent of each other when magnetic field generating coil 96 is not electrically energized.

When magnetic field generating coil 96 is electrically energized, the magnetic field created by magnetic field generating coil 96 causes magnetorheologic fluid 94 to increase in viscosity and solidify. When magnetorheologic fluid 94 solidifies, flanges 100 and flanges 104 are unable to move through magnetorheologic fluid 94, thus rotationally coupling outer rotor shaft 88 and inner rotor shaft 90. A motor can be coupled to outer rotor shaft 88 or inner rotor shaft 90 to rotate both outer rotor shaft 88 and inner rotor shaft 90 when magnetic field generating coil 96 is electrically energized. Magnetic field generating coil 96 can be electrically de-energized in the event that outer rotor shaft 88 needs to be decoupled from inner rotor shaft 90. For example, outer rotor shaft 88 can be connected to a motor and inner rotor shaft 90 can be connected to a ball screw assembly via a gear reduction system. In the event that the ball screw assembly should seize, outer rotor shaft 88 can be decoupled from inner rotor shaft 88 so as to disconnect the motor from the ball screw assembly to prevent the motor from overheating.

In view of the foregoing description, it will be recognized that the present disclosure provides numerous advantages and benefits. For example, the present disclosure provides linear actuation assembly 10 and rotational actuation assembly 86. Both actuation systems can use a magnetic field generating coil, a fluid chamber, and magnetorheological fluid to couple and decouple a first shaft from a second shaft without the need to rely on heavy mechanical or hydraulic clutches. Because linear actuation assembly 10 and rotational actuation assembly 86 both use a magnetic field generating coil and magnetorheological fluid to couple and decouple a first shaft from a second shaft, linear actuation assembly 10 and rotational actuation assembly 86 are electrically connected and controlled, thereby allowing linear actuation assembly 10 and rotational actuation assembly 86 to be used remotely in an aircraft to actuate a flight control system without the need of mechanical linkages to connect linear actuation assembly 10 and rotational actuation assembly 86 to a control board of the aircraft.

The following are non-exclusive descriptions of possible embodiments of the present invention.

In one embodiment, an actuation assembly includes a first shaft comprising a first end disposed opposite a second end. The actuation assembly further includes a second shaft with a first end disposed opposite a second end. The first end of the second shaft is disposed within the second end of the first shaft such that the first end of the second shaft can move relative the second end of the first shaft. A fluid chamber formed between the first shaft and the second shaft at the second end of the first shaft. Magnetorheologic fluid is disposed inside the fluid chamber and a magnetic field generating coil is disposed around the second end of the first shaft and the first end of the second shaft.

The actuation assembly of the preceding paragraph can optionally include, additionally and/or alternatively, any one or more of the following features, configurations and/or additional components:

a motor mechanically connected to the first end of the first shaft and configured to actuate the first shaft in a linear direction parallel to an axis that extends between the first and second ends of the first shaft;

a plate extending from the outer surface of the second shaft and into the fluid chamber;

a plurality of orifices extending through the plate;

a third shaft comprising a first end disposed opposite a second end; a fourth shaft comprising a first end disposed opposite a second end, wherein the first end of the fourth shaft is disposed within the second end of the third shaft such that the first end of the fourth shaft can move relative the second end of the third shaft; a second fluid chamber formed between the third shaft and the fourth shaft at the second end of the third shaft; magnetorheologic fluid disposed inside the second fluid chamber; a second element extending from an outer surface of the fourth shaft and into the second fluid chamber; and a second magnetic field generating coil disposed around the second end of the third shaft and the first end of the fourth shaft;

a second motor mechanically connected to the first end of the third shaft and configured to actuate the third shaft in a linear direction parallel to an axis that extends between the first and second ends of the third shaft;

an output link connected to both the second end of the second shaft and the second end of the fourth shaft;

a motor mechanically connected to the first end of the first shaft and configured to rotate the first shaft about a center axis of the first shaft;

a method for operating the actuation assembly, the method comprising: moving the first shaft relative the second shaft to a starting position; moving the third shaft relative the fourth shaft to the starting position; solidifying the magnetorheologic fluid in the fluid chamber by activating the magnetic field generating coil; moving the output link and the second shaft by moving the first shaft; and disconnecting the output link and the second shaft from the first shaft by deactivating the magnetic field generating coil; and/or solidifying the magnetorheologic fluid in the second fluid chamber by activating the second magnetic field generating coil; moving the output link and the fourth shaft by moving the third shaft; and disconnecting the output link and the fourth shaft from the third shaft by deactivating the second magnetic field generating coil.

In another embodiment, an actuation assembly includes a first shaft comprising a first end disposed opposite a second end. The actuation assembly also includes a second shaft comprising a first end disposed opposite a second end. The first end of the second shaft is disposed within the second end of the first shaft such that the first end of the second shaft can move relative the second end of the first shaft. A fluid chamber is formed between the first shaft and the second shaft at the second end of the first shaft. Magnetorheologic fluid disposed inside the fluid chamber and an element extends from an outer surface of the second shaft and into the fluid chamber. A magnetic field generating coil is disposed around the second end of the first shaft and the first end of the second shaft.

The actuation assembly of the preceding paragraph can optionally include, additionally and/or alternatively, any one or more of the following features, configurations and/or additional components:

a plate extending from the outer surface of the second shaft and into the fluid chamber;

the first end of the first shaft is a ball screw nut;

a threaded shaft is disposed within the first end of the first shaft; and/or a linear variable differential transformer is positioned along a center axis of the actuation assembly radially within the first shaft and the second, wherein the linear variable differential transformer comprises: a tube disposed proximate a first end of the first shaft; and a core connected to a second end of the second shaft.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while FIGS. 1-3 show actuators 12, 14, 16 with ball screw assemblies 22, actuators 12, 14, 16 can incorporate other types of linear actuation means, such as roller screw assemblies or jack screw assemblies, without departing from the scope of the invention. In addition, many modifications may be made to adapt a particular situation or material to the teachings of the invention without departing from the essential scope thereof. For example, actuation assembly 10 has been described with reference to use in controlling flight control surfaces, actuation assembly 10 can be used in any application where an electromechanical actuator is needed.

Therefore, it is intended that the invention not be limited to the particular embodiment(s) disclosed, but that the invention will include all embodiments falling within the scope of the appended claims.

The invention claimed is:

1. An actuation assembly comprising:
a first shaft comprising a first end disposed opposite a second end;
a second shaft comprising a first end disposed opposite a second end, wherein the first end of the second shaft is disposed within the second end of the first shaft such that the first end of the second shaft can move relative the second end of the first shaft;
a fluid chamber formed between the first shaft and the second shaft at the second end of the first shaft;
magnetorheologic fluid disposed inside the fluid chamber;
an element extending from an outer surface of the second shaft and into the fluid chamber; and
a magnetic field generating coil disposed around the second end of the first shaft and the first end of the second shaft;
a motor mechanically connected to the first end of the first shaft and configured to actuate the first shaft in a linear direction parallel to an axis that extends between the first and second ends of the first shaft.

2. The actuation assembly of claim 1, wherein the element comprises:
a plate extending from the outer surface of the second shaft and into the fluid chamber.

3. The actuation assembly of claim 2, wherein the plate comprises:
a plurality of orifices extending through the plate.

4. The actuation assembly of claim 1 further comprising:
a third shaft comprising a first end disposed opposite a second end;
a fourth shaft comprising a first end disposed opposite a second end, wherein the first end of the fourth shaft is disposed within the second end of the third shaft such that the first end of the fourth shaft can move relative the second end of the third shaft;
a second fluid chamber formed between the third shaft and the fourth shaft at the second end of the third shaft;
magnetorheologic fluid disposed inside the second fluid chamber;
a second element extending from an outer surface of the fourth shaft and into the second fluid chamber; and
a second magnetic field generating coil disposed around the second end of the third shaft and the first end of the fourth shaft.

5. The actuation assembly of claim 4 further comprising:
a second motor mechanically connected to the first end of the third shaft and configured to actuate the third shaft in a linear direction parallel to an axis that extends between the first and second ends of the third shaft.

6. The actuation assembly of claim 5 further comprising:
an output link connected to both the second end of the second shaft and the second end of the fourth shaft.

7. A method for operating the actuation assembly of claim 6, the method comprising:
moving the first shaft relative the second shaft to a starting position;
moving the third shaft relative the fourth shaft to the starting position;
solidifying the magnetorheologic fluid in the fluid chamber by activating the magnetic field generating coil;
moving the output link and the second shaft by moving the first shaft; and
disconnecting the output link and the second shaft from the first shaft by deactivating the magnetic field generating coil.

8. The method of claim 7, the method further comprising:
solidifying the magnetorheologic fluid in the second fluid chamber by activating the second magnetic field generating coil;
moving the output link and the fourth shaft by moving the third shaft; and
disconnecting the output link and the fourth shaft from the third shaft by deactivating the second magnetic field generating coil.

9. The actuation assembly of claim 1 further comprising:
a motor mechanically connected to the first end of the first shaft and configured to rotate the first shaft about a center axis of the first shaft.

10. An actuation assembly comprising:
a first shaft comprising a first end disposed opposite a second end;
a second shaft comprising a first end disposed opposite a second end, wherein the first end of the second shaft is disposed within the second end of the first shaft such that the first end of the second shaft can move relative the second end of the first shaft;
a fluid chamber formed between the first shaft and the second shaft at the second end of the first shaft;
magnetorheologic fluid disposed inside the fluid chamber; and
a magnetic field generating coil disposed around the second end of the first shaft and the first end of the second shaft;
wherein the first end of the first shaft is a ball screw nut.

11. The actuation assembly of claim 10 further comprising:
a plate extending from the outer surface of the second shaft and into the fluid chamber.

12. The actuation assembly of claim 10, wherein a threaded shaft is disposed within the first end of the first shaft.

13. The actuation assembly of claim 10, wherein a linear variable differential transformer is positioned along a center axis of the actuation assembly radially within the first shaft and the second, wherein the linear variable differential transformer comprises:
a tube disposed proximate a first end of the first shaft; and
a core connected to a second end of the second shaft.

* * * * *